United States Patent
Gupta et al.

(10) Patent No.: US 9,407,569 B1
(45) Date of Patent: *Aug. 2, 2016

(54) PROVIDING NOTIFICATION OF COMPUTING RESOURCE AVAILABILITY FOR ON-DEMAND ALLOCATION

(71) Applicant: Amazon Technologies, Inc., Seattle, WA (US)

(72) Inventors: Diwakar Gupta, Redmond, WA (US); Eric Paul Wei, Seattle, WA (US); James Alfred Gordon Greenfield, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/099,486

(22) Filed: Dec. 6, 2013

Related U.S. Application Data (63) Continuation of application No. 12/789,503, filed on May 28, 2010, now Pat. No. 8,606,920.

(51) Int. Cl.
*G06F 15/173* (2006.01)
*H04L 12/911* (2013.01)

(52) U.S. Cl.
CPC .................... *H04L 47/70* (2013.01)

(58) Field of Classification Search
None
See application file for complete search history.

(56) References Cited

U.S. PATENT DOCUMENTS

| | | | |
|---|---|---|---|
| 6,799,208 B1 | 9/2004 | Sankaranarayan et al. | |
| 8,019,870 B1 | 9/2011 | Eppstein et al. | |
| 8,086,723 B2 * | 12/2011 | Aydin et al. | 709/224 |
| 2001/0013053 A1 * | 8/2001 | Yamazaki | G06F 3/1205 709/203 |
| 2003/0167329 A1 | 9/2003 | Kurakake et al. | |
| 2006/0095259 A1 | 5/2006 | Bahl et al. | |
| 2011/0040861 A1 * | 2/2011 | Van der Merwe | H04L 29/08729 709/223 |

OTHER PUBLICATIONS

U.S. Appl. No. 12/789,503, filed May 28, 2010, Gupta et al.
U.S. Official Action dated Dec. 21, 2011 in U.S. Appl. No. 12/789,503, filed May 28, 2010, First Named Inventor: Diwakar Gupta.
U.S. Official Action dated Apr. 30, 2012 in U.S. Appl. No. 12/789,503, filed May 28, 2010, First Named Inventor: Diwakar Gupta.
U.S. Notice of Allowance/Allowability dated Aug. 21, 2013 in U.S. Appl. No. 12/789,503, filed May 28, 2010, First Named Inventor: Diwakar Gupta.

* cited by examiner

*Primary Examiner* — Scott B Christensen
(74) *Attorney, Agent, or Firm* — Lee & Hayes, PLLC (57) ABSTRACT

Technologies are described herein for providing notifications of computing resource availability for on-demand allocation. A resource request is received from a requesting application indicating the type, size, number, and other parameters of the computing resources desired. Upon determining that the requested computing resources are not immediately available, suitable alternative resources are determined based on the parameters of the requested resources. The availability of computing resources at the service provider is monitored, and when the requested resources or suitable alternatives become available, the requesting application is sent one or more resource availability notifications describing the available resources. The requesting application may then allocate the available resources from the service provider on-demand.

20 Claims, 4 Drawing Sheets

PROVIDING NOTIFICATION OF COMPUTING RESOURCE AVAILABILITY FOR ON-DEMAND ALLOCATION

CROSS-REFERENCE TO RELATED APPLICATIONS

This application is a continuation of co-pending U.S. application Ser. No. 12/789,503, entitled "PROVIDING NOTIFICATION OF COMPUTING RESOURCE AVAILABILITY FOR ON-DEMAND ALLOCATION" filed May 28, 2010, which is expressly incorporated herein by reference in its entirety.

BACKGROUND

A service provider may provide remote computing resources available over the Internet or other network for use by customers for various information processing needs. An individual customer may request and have allocated processing resources, storage resources, database resources, communication resources, and the like. The computing resources may be allocated for continuous use by the customer or for a specific period of time. The number, type, size, and configuration of the requested computing resources may vary by application. For example, a university may require a large number of processing resources for a few hours to solve a complex mathematical problem, while an online merchant may require highly-available web services that the merchant may scale up or down on a real-time basis to coincide with the demand for a new product being made available for purchase online.

The service provider may provide computing resources in different types, sizes, and configurations to meet the various demands of its customers. In addition, the service provider may provide an application programming interface ("API"), such as a web service, that allows the customer to allocate and manage the various, available computing resources on-demand. Allowing on-demand allocation of remote computing resources may eliminate the need for the customer to make large and expensive hardware purchases and reduces the need of customers to forecast future resources requirements or network traffic, because the customer is able to immediately deal with changes in requirements or spikes in popularity related to their application or service. However, because availability of the computing resources is not within the customer's control, the requested resources may not always be available in the amount or at the time that the customer requires.

It is with respect to these and other considerations that the disclosure made herein is presented.

DETAILED DESCRIPTION

The following detailed description is directed to technologies for providing notifications of computing resource availability for on-demand allocation. Utilizing the technologies described herein, a service provider providing remote computing resources may receive a request for the allocation of resources from a requesting application. If the requested computing resources are not immediately available, suitable alternative resources that satisfy the request may be suggested to the requesting application. In addition, the requesting application may receive subsequent notifications when the requested computing resources or suitable alternatives become available to satisfy the request. In this way, the requesting application remains engaged with the service provider to ultimately fulfill the request for resources, instead of simply receiving an error message indicating that the requested computing resources are unavailable. These and other advantages and features will become apparent from a reading of the following disclosure and a review of the associated drawings.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
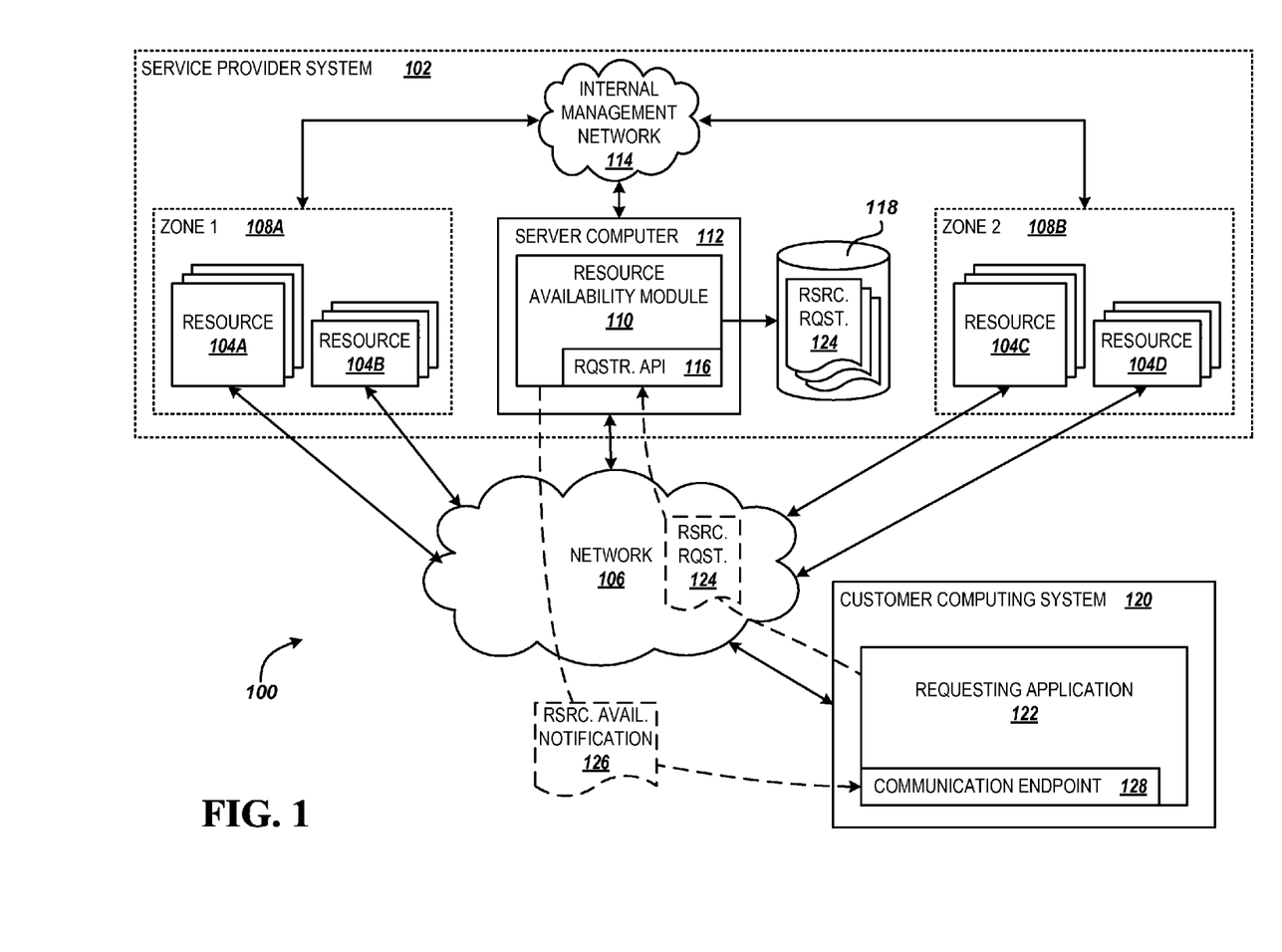
FIG. 1 is a system and network diagram showing aspects of an illustrative operating environment for providing notifications of computing resource availability for on-demand allocation, including several software and hardware components provided by embodiments presented herein.

FIG. 1 and the following description are intended to provide a brief, general description of a suitable computing environment in which the embodiments described herein may be implemented. In particular, FIG. 1 is a system and network diagram that shows an illustrative operating environment 100 including several software components for providing notifications of computing resource availability for on-demand allocation, according to embodiments provided herein. The environment 100 comprises a service provider system 102 that includes a number of computing resources 104A-104D (referred to herein generally as computing resources 104) that are available for allocation and use by customers of the service provider.

The computing resources 104 may include various types of resources, such as data processing resources, data storage resources, communication resources, and the like. Each type of computing resource 104 may be general-purpose or may be available in a number of specific configurations. For example, data processing resources may be available as web servers, application servers, media servers, database servers, and the like, while data storage resources may include file storage devices, block storage devices, and the like. Further, each type or configuration of computing resource 104 may be available in different sizes, such as large resources 104A, 104C consisting of many processors, large amounts of memory, and/or large storage capacity, and small resources 104B, 104D consisting of fewer processors, smaller amounts of memory, and/or smaller storage capacity. Customers may choose to allocate a number of small processing resources 104B as web servers and/or one large processing resource 104A as a database server, for example.

The customer and other consumers of the allocated computing resources 104 may access the resources over a network 106. The network 106 may represent one or more of a local-area network ("LAN"), a wide-area network ("WAN"), the Internet, or any other networking topology known in the art that connects the computing resources 104 to remote consumers of the resources. According to one embodiment, the computing resources 104 may be divided into a number of zones 108A-108B (referred to herein generally as zone 108). The zones 108 may correspond to specific regional data centers, for example.

The customer may desire to allocate computing resources 104 in a particular zone 108 in order to have the resources geographically close to the consumers of the resources, for example, or the customer may require computing resources to be allocated and operated in a particular zone for geopolitical reasons. Further, data exchanged between computing resources 104 within the same zone 108 may be free, while data exchanged between computing resources in different zones may incur additional costs for the customer. Additionally or alternatively, the zones 108 may represent levels of reliability of the included computing resources 104, security of the resources, availability of the resources, and the like.

A resource availability module 110 may execute within the service provider system 102 that is responsible for monitoring the availability of the various computing resources 104 and responding to requests to allocate resources from customers. The resource availability module 110 may execute on a single server computer 112 or in parallel across multiple server computers in the service provider system 102. In addition, the resource availability module 110 may consist of a number of subcomponents executing on different server computers 112 or other computing devices in the service provider system 102. The resource availability module 110 may be implemented as software, hardware, or any combination of the two. The resource availability module 110 may monitor available computing resources 104 in the service provider system 102 over an internal management network 114, for example.

The resource availability module 110 may receive and respond to requests to allocate computing resources received from a customer computing system 120. The customer computing system 120 may represent one or more server computers, personal computers ("PC"), desktop workstations, laptops, notebooks wireless telephones, personal digital assistants ("PDA"), e-readers, game consoles, set-top boxes, consumer electronics devices, and the like. A requesting application 122 may execute on the customer computing system 120 that allocates and manages computing resources 104 provided by the service provider. The requesting application 122 may be implemented in hardware or software.

According to embodiments, the requesting application 122 may send a resource request 124 to the resource availability module 110 to request allocation of computing resources 104 in response to a need for the resources by the customer. For example, customer personnel may indicate to the requesting application 122 that a number of processing resources are needed for a research project over the next several days. The requesting application 122 may, in turn, send a resource request 124 to the resource availability module 110 to allocate the needed computing resources 104 on-demand. The resource request 124 may be a data structure indicating the number, type, zone, size, and configuration of the desired computing resources 104, as will be described in more detail in regard to FIG. 2.

In one embodiment, the requesting application 122 utilizes a specific requesting application programming interface ("API") 116, such as a Web service, provided by the resource availability module 110 to send the resource request 124. It will be appreciated that the requesting application 122 may utilize other methods known in the art to transmit the resource request 124 to the resource availability module 110, such as via an e-mail message, via a short message system ("SMS") text message, through a web-based user interface ("UI"), via a proprietary client-server protocol, and the like. It is intended that this application include all such methods of transmitting the resource request 124 between the requesting application 122 and the resource availability module 110.

As will be described in more detail below in regard to FIG. 4, upon receiving a resource request 124 from a requesting application 122, the resource availability module 110 evaluates the request and determines the availability of the requested computing resources 104 within the service provider system 102. In a traditional implementation, if the requested computing resources 104 were not available, the resource availability module 110 may simply respond with an error indicating the requested computing resources 104 were not available for allocation. According to embodiments described herein, however, the resource availability module 110 may provide alternative suggestions for number, type, size, zone, and configuration of available computing resources 104 that may satisfy the resource request 124. In addition, the resource availability module 110 may store the pending resource request 124 in a database 118 or other storage mechanism. When the requested computing resources 104 or suitable alternatives become available in the service provider system 102, the resource availability module 110 may inform the requesting application 122 of the available resources.

The resource availability module 110 may inform the requesting application 122 that the requested computing resources 104 or suitable alternatives are available by sending a resource availability notification 126 to the application. The resource availability notification 126 may be a data structure that describes the number, type, size, zone, and configuration of available computing resources 104 that may satisfy the corresponding resource request 124, as will be described in more detail below in regard to FIG. 3. In one embodiment, the resource availability module 110 sends the resource availability notification 126 in conjunction with an error message returned to the requesting application 122 in response to a resource request 124 for which the requested computing resources 104 are not currently available. In another embodiment, when the computing resources 104 requested in a pending resource request 124 or suitable alternatives become available, the resource availability module 110 sends a resource availability notification 126 describing the available resources to a communication endpoint 128 specified in the corresponding resource request.

The communication endpoint 128 may be a Web service, an e-mail box, a publish-subscribe type notification service, a proprietary service, or other communication endpoint reachable by the resource availability module 110 across the network 106. The communication endpoint 128 may be implemented by the requesting application 122 or another application executing in the customer computing system 120. Upon receiving the resource availability notification 126 at the communication endpoint 128, the requesting application 122 or other application may determine if the available computing resources 104 described adequately satisfy the needs of the customer that originally generated the corresponding resource request 124. If the needs are satisfied, the requesting application 122 or other application may then allocate some or all of the available computing resources 104 on-demand, through the requester API 116 provided by the resource availability module 110, for example.

Figure 2:
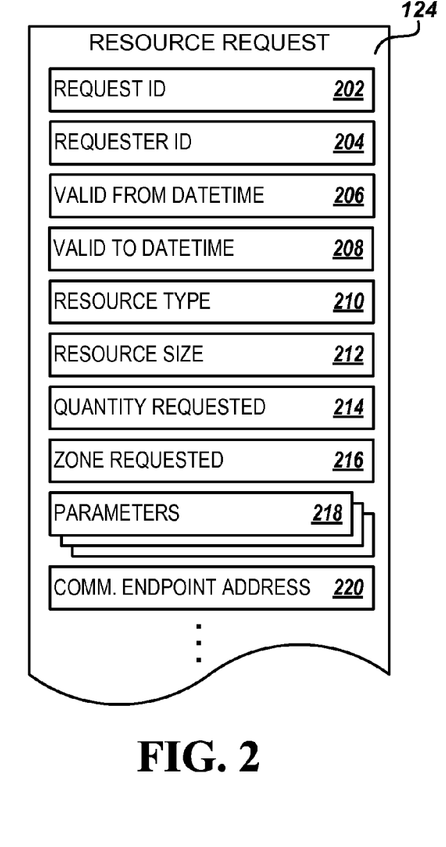
FIG. 2 is a data structure diagram illustrating a number of data elements stored in an resource request, according to embodiments presented herein.
Figure 3:
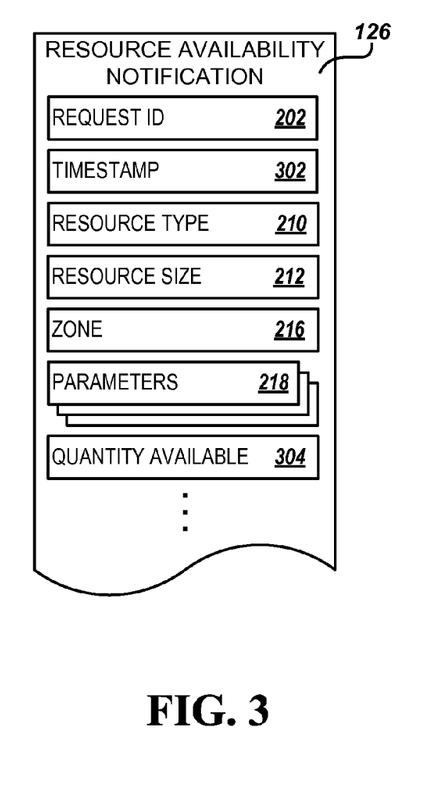
FIG. 3 is a data structure diagram illustrating a number of data elements stored in a resource availability notification, according to embodiments presented herein.

Turning now to FIGS. 2 and 3, one or more data structures containing a number of data elements will be described. It will be appreciated by one skilled in the art that the data structures shown in the figures may represent rows in a database table, objects stored in a computer memory, programmatic structures, or any other data containers commonly known in the art. Each data element included in the data structures may represent one or more fields or columns of a database row, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

In particular, FIG. 2 shows one example of data elements that may be stored in the resource request 124, according to embodiments. As described above, the resource request 124 contains information indicating the number, type, size, zone, configuration, and other parameters of the desired computing resources 104. The resource request 124 may contain a resource request ID 202 that uniquely identifies the resource request 124. The resource request ID 202 may be supplied by the requesting application 122 upon submission of the resource request 124, or may be generated by the resource availability module 110 when the request is received and then returned to the requesting application. The resource request ID 202 may be utilized by the resource availability module 110 to track the request and will be included in any corresponding resource availability notifications 126, as described below, allowing the requesting application 122 to associate the notifications with the corresponding resource request 124.

The resource request 124 may contain a requester ID 204 that identifies the customer requesting the computing resources 104. In one embodiment, the resource availability module 110 may utilize the requester ID 204 in determining suitable alternatives for number, type, size, zone, and configuration of available computing resources 104 that may satisfy the corresponding resource request 124. For example, the resource availability module 110 may consider the resource utilization history or recent activity of the customer identified by the requester ID 204 to determine the types of computing resources 104 required.

In another embodiment, the service provider may configure the resource availability module 110 to respond to a resource request 124 with a resource availability notification 126 indicating subsequently available computing resources 104 or suitable alternatives only for a subset of the service provider's customers. This may prevent new customers or potential competitors from "fishing" for availability of computing resources 104 in the service provider system 102. The resource availability module 110 may utilize the requester ID 204 in the resource request 124 to determine whether the requesting customer is among the customers for which resource availability notifications 126 may be generated. If the requester ID 204 indicates the customer is not to receive suggestions of alternative computing resources 104, then the resource availability module 110 may simply respond with an error message when the requested computing resources 104 are not available, for example.

The resource request 124 may contain a valid-from datetime 206 and/or a valid-to datetime 208. The requesting application 122 may set the values of the valid-from datetime 206 and a valid-to datetime 208 to indicate a period of time for which the resource request 124 is valid. According to one embodiment, the resource availability module 110 may only respond with a resource availability notification 126 indicating that the requested computing resources 104 or suitable alternative are available if the resources become available within the indicated period of time.

The resource request 124 may also contain a resource type 210 indicating the type of computing resources 104 being requested. For example, the resource type 210 may indicate that the resource request 124 is for processing-type resources, storage-type resources, communication-type resources, and the like. Similarly, the resource request 124 may contain a resource size 212 indicating the size of the resource requested. The resource size 212 may indicate the number or speed of the central-processing units for processing-type resources, a storage capacity for storage-type resources, a bandwidth capacity for communication-type resources, and the like. For example, a "small" processing resource may refer to a computing unit with relatively lesser processing capabilities, while an "extra large" processing unit may refer to a computing unit with relatively greater processing capabilities.

The resource request 124 may also contain a quantity requested 214 indicating the number of computing resources 104 of the resources type 210 and resource size 212 desired. For example, 100 small Web servers may be desired by a customer to provide payment processing, software downloading, and activation services in conjunction with the rollout of a new consumer electronic device. In one embodiment, the resource availability module 110 may utilize the combination of resource type 210, resource size 212, and quantity requested 214 from the resource request 124 in determining suitable alternatives for number, type, size, zone, and configuration of available computing resources 104 that may satisfy the request. For example, in the case of the request for 100 small Web servers by the customer described above, the resource availability module 110 may suggest five extra-large Web servers as a suitable alternative. In another embodiment, if the quantity requested 214 is above some threshold value, the resource availability module 110 may deny the resource request 124, and instead return instructions for the requesting customer to initiate an off-line request with service provider personnel in order to allow the service provider to schedule the allocation of excessively large numbers of resources.

According to one embodiment, the resource request 124 also contains a zone requested 216 indicating the desired zone 108 from which the requested computing resources 104 are to be allocated. The requesting application 122 may specify a particular zone requested 216 in the resource request 124 in order to have the requested computing resources 104 located geographically close to the consumers of the resources or for geopolitical reasons, for example. Alternatively, the requesting application 122 may specify a zone requested 216 indicating a zone 108 in which existing computing resources 104 currently allocated to the customer reside, in order to avoid additional costs that may be incurred with data exchanged between computing resources in different zones. In a further embodiment, the zone requested 216 may specify a list of desired zones 108 for the requested computing resources 104, in a priority order. The resource availability module 110 may utilize the list of zones in determining suitable alternatives for number, type, size, zone, and configuration of available computing resources 104 that may satisfy the resource request 124.

The resource request 124 may further contain a number of additional parameters 218 describing other factors related to the request for computing resources 104. For example, additional parameters 218 may be included in the resource request 124 that specify a configuration of the computing resources 104 desired, such as an operating system ("OS") or application server software desired for processing resources; whether the resources are to be monitored or not; a maximum price the customer will pay for the requested resources; and the like. The resource availability module 110 may utilize the additional parameters 218 in determining suitable alternatives for number, type, size, zone, and configuration of available computing resources 104 that may satisfy the resource request 124.

In one embodiment, an additional parameter 218 may contain an indication of whether the requesting application 122 desires the suggestion of suitable alternative computing resources 104 that may satisfy the resource request 124 in cases where the requested resources are not currently available. If the additional parameter 218 indicates that alternative resources are not desired, the resource availability module 110 will not send a resource availability notification 126 describing suitable alternative resources in conjunction with the error message returned to the requesting application 122 indicating that the requested computing resources 104 are not currently available. However, the resource availability module 110 may still send resource availability notification(s) 126 describing available resources to the requesting application 122 when the computing resources 104 requested in the pending resource request 124 subsequently become available.

In another embodiment, an additional parameter 218 may contain a minimum quantity value indicating a minimum quantity of the requested computing resources 104 for which the requesting application 122 wishes to be notified of availability. The resource availability module 110 may utilize the minimum quantity value to determine when to send resource availability notifications 126 to the requesting application 122 regarding available computing resources 104 for the request. For example, the resource request 124 may specify a quantity requested 214 of 100 small Web servers, with an additional parameter 218 specifying a minimum quantity value of 20. The resource availability module 110 may send a resource availability notification 126 to the requesting application 122 each time 20 or more small Web servers become available.

Further, the resource availability module 110 may continue to send resource availability notifications of 20 or more small Web servers being available until the entire quantity requested 214 specified in the resource request 124 has been allocated by the requesting application 122, or until the requesting application 122 fails to respond to a resources availability notification within a timely manner. Other additional parameters 218 describing the configuration, limitations, and/or other factors regarding the request for computing resources 104 may be imagined beyond those described above, and it is intended that this application include all such parameter values.

In a further embodiment, the resource request 124 contains a communication endpoint address 220. The communication endpoint address 220 specifies a communication endpoint 128 to which the resource availability module 110 may send a resource availability notification 126 when the computing resources 104 specified in resource request 124 or suitable alternatives become available, as described above in regard to FIG. 1. The communication endpoint address may be a uniform resource locator ("URL"), an e-mail address, an Internet protocol ("IP") address and port specification, or any other address of a communication endpoint 128 known in the art. It will be appreciated that the resource request 124 may contain additional data elements describing the requested computing resources 104, beyond those shown in FIG. 2 and described above. The resource request 124 may also contain fewer or different data elements than those shown in the figure. It is intended that all such data elements contained in the resource request 124 be included in this application.

FIG. 3 shows one example of data elements that may be stored in the resource availability notification 126, according to embodiments. As described above, the resource availability notification 126 contains information describing the number, type, size, zone, and configuration of available computing resources 104 that may satisfy a corresponding resource request 124. According to one embodiment, the resource availability notification 126 contains the resource request ID 202 from the corresponding resource request 124. The resource request ID 202 may allow the requesting application 122 to associate the resource availability notification 126 with the original resource request 124 for which it was generated.

The resource availability notification 126 may contain a timestamp 302 indicating the time that computing resources 104 became available. In one embodiment, the resource availability module 110 may hold the computing resources 104 described in the resource availability notification 126 reserved for some period of time. The timestamp 302 in the resource availability notification 126 may be utilized by the requesting application 122 to determine how long the computing resources 104 may be available. In another embodiment, the computing resources 104 described by the resource availability notification 126 may not be reserved or guaranteed, and a subsequent request to allocate the resources by the requesting application 122 may still fail due to unavailability.

In a further embodiment, the resource availability module 110 may utilize the timestamp 302 of the last resource availability notification 126 sent to the requesting application 122 to determine if the corresponding resource request 124 should remain pending. If the requesting application 122 does not respond to the resource availability notification 126 with an allocation of computing resources 104 in a specific period of time, then the resource availability module 110 may assume the resources are no longer desired and may mark the corresponding resource request 124 in the database 118 as no longer pending, even if the valid-to datetime 208 of the request has not been reached.

The resource availability notification 126 also contains the resource type 210, resource size 212, zone 216, and other parameters 218 describing the available computing resources 104. As described above, the values for the resource type 210, resources size 212, zone 216, and other parameters 218 may be the same as the corresponding elements in the corresponding resource request 124, indicating the requested computing resources 104 have become available at a point subsequent to the original request. The values for the resource type 210, resources size 212, zone 216, and other parameters 218 may also describe different computing resources 104, determined by the resource availability module 110 to be suitable alternatives that satisfy the corresponding resource request 124. As will be described in more detail below in regard to FIG. 4, suitable alternative computing resources 104 may be suggested based on the history of the customer identified by the requester ID 204; the combination of resource type 210, resource size 212, and quantity requested 214; the requested zone 216 or list of requested zones; and/or the additional parameters 218 from the corresponding resource request 124, for example.

The resource availability notification 126 may further contain a quantity available 304 indicating the number of the computing resources 104 of the indicated resource type 210 and resource size 212 available in the indicated zone 216. Just as described above, the quantity available 304 may be the same as the quantity requested 214 specified in the corresponding resource request 124, indicating the requested quantity has become available, or the quantity available may be less than the quantity requested. The quantity available 304 may be less than the quantity requested 214 when the resource availability module 110 is suggesting alternative computing resources 104 of a larger resource size 212 and/or different resource type 210, for example.

In one embodiment, the quantity available 304 may be less than the quantity requested 214 when a subset of the requested computing resources 104 is available. As described above in regard to FIG. 2, the resource availability module 110 may send multiple resource availability notifications 126 describing lesser quantities of available computing resources 104 that partially satisfy the corresponding resource request 124, as long as the request remains pending. It will be appreciated that the resource availability notification 126 may contain additional data elements describing the available computing resources 104, beyond those shown in FIG. 3 and described above. The resource availability notification 126 may also contain fewer or different data elements than those shown in the figure. It is intended that all such data elements contained in the resource availability notification 126 be included in this application.

Figure 4:
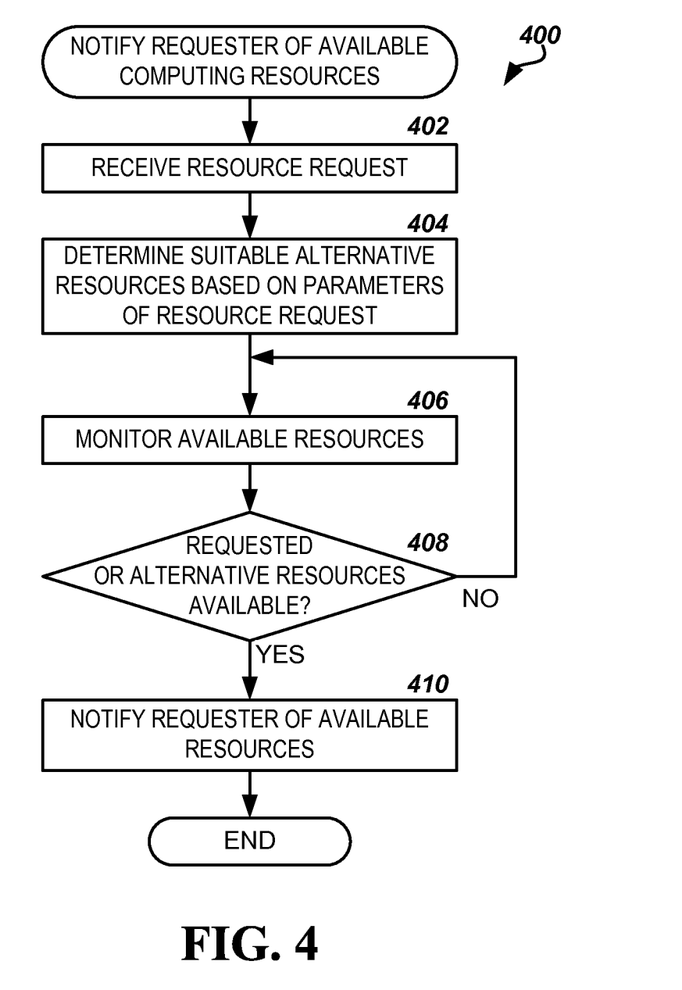
FIG. 4 is a flow diagram showing methods of notifying a requesting application of available computing resources suitable to satisfy a resource request, according to embodiments described herein.

Turning now to FIG. 4, additional details will be provided regarding the embodiments presented herein for providing notifications of computing resource availability for on-demand allocation. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 illustrates a routine 400 for notifying the requesting application 122 of available computing resources 104 suitable to satisfy a resource request 124, according to embodiments described herein. In one embodiment, the routine 400 is performed by the resource availability module 110. It will be appreciated that the routine 400 may also be performed by another module or component of the service provider system 102, or by a combination of modules and components.

The routine 400 begins at operation 402, where the resource availability module 110 receives the resource request 124. For example, the resource request 124 may be received through the requester API 116 described above in regard to FIG. 1. In one embodiment, the resource request 124 consists of an on-demand allocation request received from the requesting application 122 through the requester API 116. The resource availability module 110 may check availability of the computing resources 104 specified in the allocation request and determine that insufficient resources are available to satisfy the request. The resource availability module 110 may return an error message to the requesting application 122 indicating that the requested computing resources 104 are unavailable.

From operation 402, the routine 400 proceeds to operation 404, where the resource availability module 110 determines suitable alternative computing resources 104 that may satisfy the resource request 124. In one embodiment, the resource availability module 110 may determine the suitable alternative computing resources 104 based on the combination of the resource type 210, resource size 212, and quantity requested 214 specified in the resource request 124. For example, in the case of a resource request 124 for 100 small Web servers by the customer described above in regard to FIG. 2, the resource availability module 110 may suggest five extra-large Web servers as a suitable alternative.

In another embodiment, the resource availability module 110 may select an alternative zone 108 in which the requested computing resources 104 are available. The alternative zone 108 may be selected from a list of zones specified in the zone requested 216 element of the resource request 124, for example. In further embodiments, the resource availability module 110 may consider the resource utilization history or recent activity of the requesting customer, unutilized or under-utilized resources currently allocated to the customer that may be converted to the requested type and configuration, alternative configurations that could be utilized, differently sized resources that satisfy a price parameter 218 specified in the request, and the like in determining suitable alternative computing resources 104 that may satisfy the resource request 124.

According to one embodiment, the resource availability module 110 may include a resource availability notification 126 suggesting any available alternative computing resources 104 with the error message returned to the requesting application 122. Additionally, or alternatively, the resource availability module 110 may store the resource request 124 in the database 118 as a pending request. The resource request 124 may remain pending for the period of time specified by the valid-from datetime 206 and valid-to datetime 208 values in the request, until the requesting application 122 has requested allocation of computing resources 104 sufficient to satisfy the entire resource request, or until the requesting application fails to timely respond to a resource availability notification 126 associated with the resource request, for example.

The routine 400 proceeds from operation 404 to operation 406, where the resource availability module 110 monitors the availability of computing resources 104 in the service provider system 102. At operation 408, the resource availability module 110 periodically checks each pending resource request 124 in the database 118 to determine if the requested computing resources 104 or suitable alternatives are available to satisfy the request. If no computing resources are available to satisfy the pending resource request 124, the routine 400 returns to operation 406, where the resource availability module 110 continues to monitor the availability of computing resources 104 in the service provider system 102.

If, at operation 408, sufficient computing resources 104 are available to satisfy some or all of the requested resources in the pending resource request 124, the routine 400 proceeds to operation 410, where the resource availability module 110 sends a resource availability notification 126 describing the available resources to the requesting application 122. As described above in regard to FIG. 3, the resource availability notification 126 contains information describing the number, type, size, zone and configuration of the available computing resources 104 deemed by the resource availability module 110 to be suitable for the corresponding resource request 124. Upon receiving the resource availability notification 126, the requesting application 122 may then allocate the described computing resources 104 on-demand through an allocation request sent to the resource availability module 110 through the requester API 116, for example. Alternatively, if the suggested alternative computing resources 104 are not satisfactory to the requesting application 122, the application may discard the resource availability notification 126 and await a subsequent notification that the original computing resources requested are available. From operation 410, the routine 400 ends.

Figure 5:
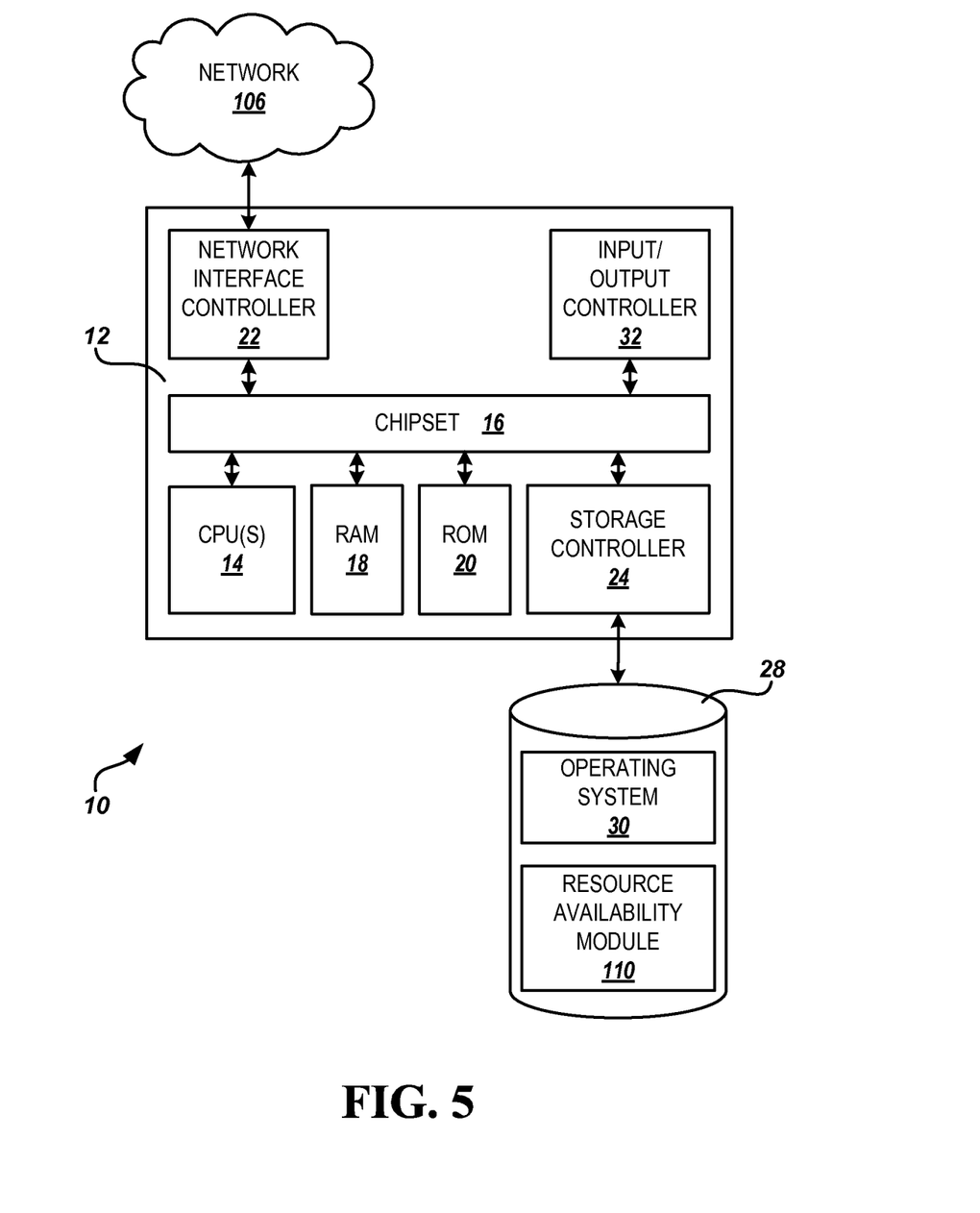
FIG. 5 is a computer architecture diagram showing an illustrative computer hardware architecture for computing devices described in embodiments presented herein.

FIG. 5 shows an example computer architecture 10 for a computer 12 capable of executing the software components described herein for providing notifications of computing resource availability for on-demand allocation, in the manner presented above. The computer architecture 10 shown in FIG. 5 illustrates a conventional server computer, workstation, desktop computer, laptop, network appliance, personal digital assistant ("PDA"), e-reader, digital cellular phone, or other computing device, and may be utilized to execute any aspects of the software components presented herein described as executing on the server computer 112, the customer computing system 120, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through the network 106. The chipset 16 includes functionality for providing network connectivity through a network interface controller ("NIC") 22, such as a gigabit Ethernet adapter. The NIC 22 is capable of connecting the computer 12 to other computing devices over the network 106, such as the customer computing system 120, other server computers 112 in the service provider system 102, and the like. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage units.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, and the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable storage media to store and retrieve information, such as program modules, data structures, or other data. It should be appreciated by those skilled in the art that computer-readable storage media can be any available media that provides storage of non-transitory data and that may be accessed by the computer 12. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized.

The mass storage device 28 may store other system or application programs and data utilized by the computer 12, such as the resource availability module 110 described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routine 400 for providing notifications of computing resource availability for on-demand allocation, as described above in regard to FIG. 4.

The computer 12 may also include an input/output controller 32 for receiving and processing input from a number of input devices 34, such as a keyboard, a mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computer 12 may not include all of the components shown in FIG. 5, may include other components that are not explicitly shown in FIG. 5, or may utilize an architecture completely different than that shown in FIG. 5.

Based on the foregoing, it should be appreciated that technologies for providing notifications of computing resource availability for on-demand allocation are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method, comprising:
receiving a request for computing resources of a service provider system from a requesting application;
determining that the requested computing resources are not currently available;
determining suitable alternative computing resources based, at least in part, on a resource utilization history for a user associated with the request to attempt to satisfy the request, wherein the suitable alternative computing resources comprise computing resources of at least one of a different size, a different type, or a different quantity from the requested computing resources;
determining that the suitable alternative computing resources are not currently available;
monitoring the availability of the requested computing resources and the suitable alternative computing resources in the service provider system to determine that the requested computer resources or the suitable alternative computing resources are available; and
based at least in part on to determining that the requested computer resources or the suitable alternative computing resources are available, sending a resource availability notification to the requesting application indicating that the requested computing resources or the suitable alternative computing resources have become available, wherein the requesting application allocates the requested computing resources or the suitable alternative computing resources indicated in the resource availability notification from the service provider system in response to receiving the resource availability notification.

2. The computer-implemented method of claim 1, wherein the resource availability notification indicating that the suitable alternative computing resources are available is sent to the requesting application in conjunction with an error message indicating that the requested computing resources are not currently available.

3. The computer-implemented method of claim 1, wherein the resource availability notification indicating that the requested computing resources are available is sent to the requesting application at a time after determining that the requested computing resources are not currently available and then subsequently determining that the requested computing resources have become available.

4. The computer-implemented method of claim 1, wherein the resource availability notification indicates that a lesser quantity of the requested computing resources is available than satisfies the request, and wherein a plurality of resource availability notifications are sent to the requesting application as more of the requested computing resources becomes available.

5. The computer-implemented method of claim 1, wherein the resource availability notification is sent to a communication endpoint specified by the requesting application in the resource request.

6. The computer-implemented method of claim 5, wherein the communication endpoint specified by the requesting application in the resource request comprises a uniform resource locator ("URL") of a web service.

7. The computer-implemented method of claim 5, wherein the communication endpoint specified by the requesting application in the resource request comprises an e-mail address.

8. A system for providing notifications of available computing resources in a service provider system based on a resource request, the system comprising:
an application programming interface ("API") configured to receive requests for allocation of computing resources from a requesting application; and
a resource availability module executing on a server computer and configured to
receive the resource request from the requesting application through the API,
determine that the requested computing resources are not currently available,
determine suitable alternative computing resources based, at least in part, on availability of computing resources of different zones to attempt to satisfy the resource request, wherein the suitable alternative computing resources comprise computing resources of at least one of a different size, a different type, or a different quantity from the requested computing resources,
monitor the availability of the requested computing resources and the suitable alternative computing resources in the service provider system to determine whether the requested computer resources or the suitable alternative computing resources are available, and
upon determining that the requested computer resources or the suitable alternative computing resources have become available, send a resource availability notification to the requesting application indicating that the requested computing resources or the suitable alternative computing resources are available.

9. The system of claim 8, wherein the resource availability notification indicating that the suitable alternative computing resources are available is sent to the requesting application in conjunction with an error message indicating that the requested computing resources are not currently available.

10. The system of claim 8, wherein the resource availability notification indicating that the requested computing resources are available is sent to the requesting application at a time after determining that the requested computing resources are not currently available and then subsequently determining that the requested computer resources have become available.

11. The system of claim 8, wherein upon receiving the resource availability notification indicating that the requested computing resources or the suitable alternative computing resources are available, the requesting application subsequently utilizes the API to allocate the requested computing resources or the suitable alternative computing resources indicated in the resource availability notification.

12. The system of claim 8, wherein the resource availability notification is sent to a communication endpoint specified by the requesting application in the resource request.

13. The system of claim 12, wherein the communication endpoint specified by the requesting application in the resource request comprises a uniform resource locator ("URL") of a web service.

14. The system of claim 12, wherein the communication endpoint specified by the requesting application in the resource request comprises an e-mail address.

15. A non-transitory computer-readable storage medium having computer-executable instructions stored thereon that, when executed by a computer, cause the computer to:
receive a request for computing resources of a service provider system from a requesting application;
determine that the requested computing resources are not currently available;
determine suitable alternative computing resources based, at least in part, on one or more of a resource utilization history or an availability of computing resources of different zones to attempt to satisfy the request, wherein the suitable alternative computing resources comprise computing resources of at least one of a different size, a different type, or a different quantity from the requested computing resources;
monitor the availability of the requested computing resources and the suitable alternative computing resources in the service provider system to determine whether the requested computer resources or the suitable alternative computing resources are available; and
based at least in part on determining that the requested computer resources or the suitable alternative computing resources are available, send a resource availability notification to the requesting application indicating that the requested computing resources or the suitable alternative computing resources have become available, wherein the requesting application allocates the requested computing resources or the suitable alternative computing resources indicated in the resource availability notification from the service provider system in response to receiving the resource availability notification.

16. The computer-readable storage medium of claim 15, wherein the resource availability notification indicating that the suitable alternative computing resources are available is sent to the requesting application in conjunction with an error message indicating that the requested computing resources are not currently available.

17. The computer-readable storage medium of claim 15, wherein the resource availability notification indicating that the requested computing resources are available is sent to the requesting application at a time after determining that the requested computing resources are not currently available and then subsequently determining that the requested computing resources have become available.

18. The computer-readable storage medium of claim 15, wherein the resource availability notification indicates that a lesser quantity of the requested computing resources is available than satisfies the request, and wherein a plurality of resource availability notifications are sent to the requesting application as more of the requested computing resources becomes available.

19. The computer-readable storage medium of claim 15, wherein the resource availability notification is sent to a communication endpoint specified by the requesting application in the resource request.

20. The computer-readable storage medium of claim 19, wherein the communication endpoint specified by the requesting application in the resource request comprises one of a uniform resource locator ("URL") of a web service and an e-mail address.

* * * * *